Figure 2:
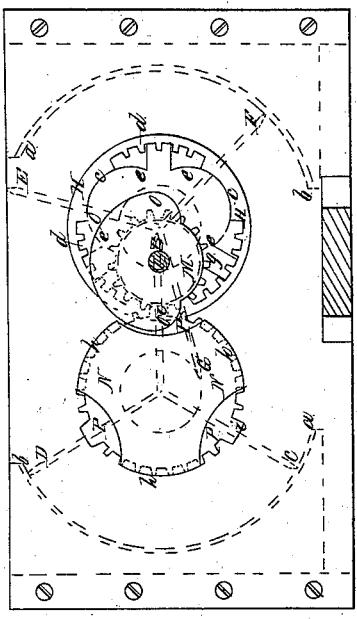
Figure 3:
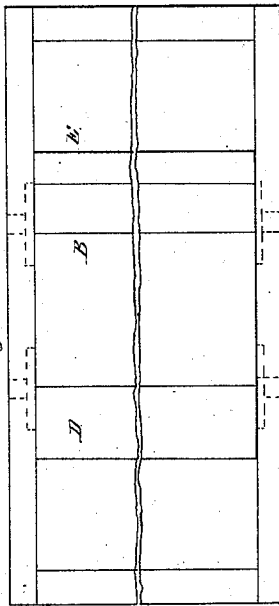
Figure 1:
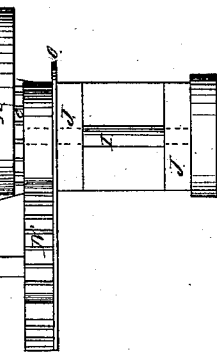
Figure 1:
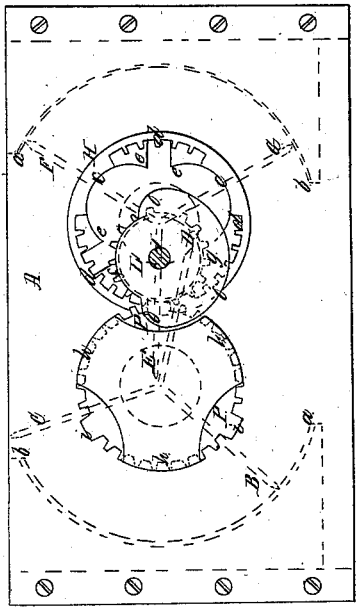

Sheet 1-2 Sheets.

S. P. Ruggles,
Rotary Pump,

N°. 79,781.        Patented July 7, 1868.

Witnesses:
Jno. D. Patten
D. M. Dove

Inventor
Stephen P. Ruggles
By Atty A. B. Stoughton.

N. PETERS, PHOTO-LITHOGRAPHER, WASHINGTON, D. C.

S. P. Ruggles,
Rotary Pump,
Nº 79,781. Patented July 7, 1868.
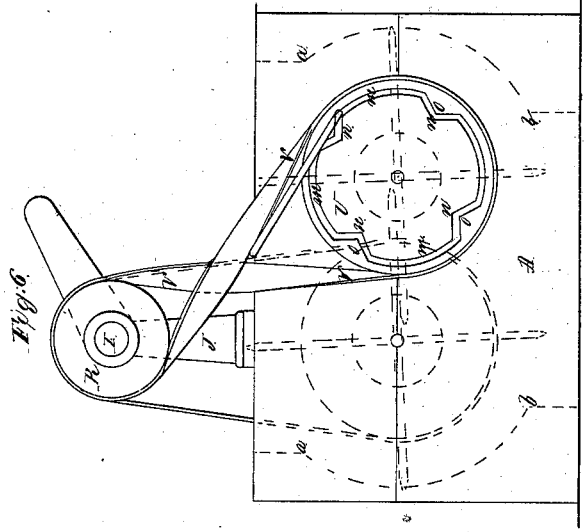
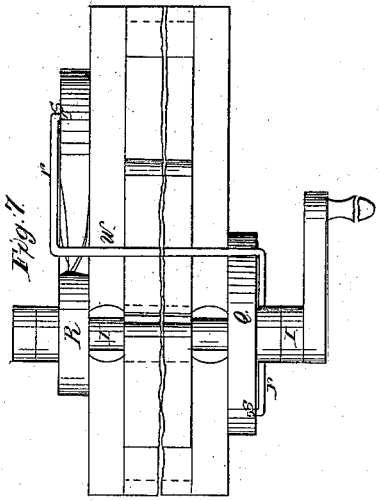
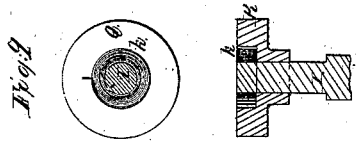
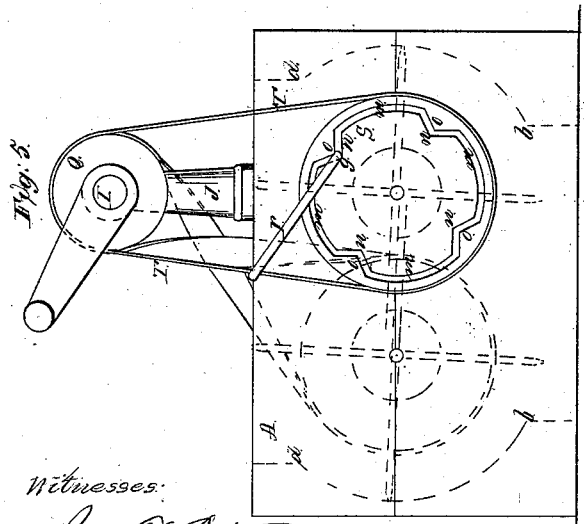
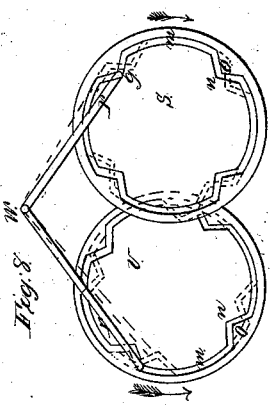
Witnesses:
Jno. D. Patten
D. M. Pore
Inventor
Stephen P. Ruggles
By Atty. A.B. Stoughton

UNITED STATES PATENT OFFICE.

STEPHEN P. RUGGLES, OF BOSTON, MASSACHUSETTS.

*Letters Patent No. 79,781, dated July 7, 1868.*

IMPROVEMENT IN ROTARY FLUID-ELEVATORS.

*The Schedule referred to in these Letters Patent and making part of the same.*

TO ALL WHOM IT MAY CONCERN:

Be it known that I, STEPHEN P. RUGGLES, of Boston, in the county of Suffolk, and State of Massachusetts, have invented a new and useful Improvement in a Machine or Apparatus for Raising, Forcing, or Passing Air, Gas, or Water in One Direction; and I do hereby declare the following to be a full, clear, and exact description of the same, reference being had to the accompanying drawings, making a part of this specification, in which—

Figures 1, 2, 3, 4 of sheet 1 represent the machine as arranged to be worked by cogged and slip-gearing, and Figures 5, 6, 7, 8, and 9 of sheet 2 represent the machine as arranged to be worked by a belt.

Similar letters of reference, where they occur in the several separate figures, denote like parts of the apparatus in all of the drawings.

My invention relates to a machine or apparatus wherein two float-wheels, with their floats, are so arranged and operated as that they pass, force, or raise air, gas, or water in one direction, and prevent it from flowing back in the opposite direction.

To enable those skilled in the art to make and use my invention, I will proceed to describe the same with reference to the drawings.

In sheet 1, A represents a box or case, in which two float-wheels, each composed of three floats, B C D and E F G, which, in turning or revolving, overlap each other, the extreme ends of each of the series extending to or nearly to the centre of rotation of the other series. From the points $a$ to $b$, these floats move in close proximity to, or in contact with, the curved surfaces, shown in the figures, so that no communication is had between the two sides of the floats as they pass along these curved surfaces, which may be packed with rubber or any other suitable packing.

The float-wheels are, moreover, so arranged and moved as that one of the floats of one of the series shall act as a cut-off at or in the space between the float-wheels, so that no communication is had between the under and upper portions of the box or case, except what is had by the floats themselves, forming buckets, as it were, to take and carry air, gas, or water from below, past the centre and into the upper portion of the case, and thence to where it is to be used or escaped.

The float-wheels turn on journals that are packed in the sides of the case, and thus, not requiring a through shaft, but little space is occupied at their centres.

The float-wheels are moved, stopped, and held by gearing, as follows:

On the journal of the floats E F G, outside of the case A, is placed a wheel, H, having sections of an internal gear, $d$, interposed by blanks or dead spaces $c$, and, behind the gear-sections and blanks, a series of cams, $e$.

Figure 4:
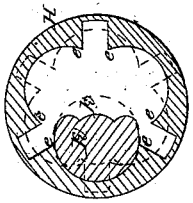

On a shaft, I, supported in bearing-blocks J J, and turned by any suitable power, and within the hollow or dished portion of the wheel H, there is placed, first, a cam, K, fig. 4, which turns against or in contact with the cam-surfaces $e$, and which, when in the position shown in black lines in said fig. 4, locks the wheel H, and prevents it from moving, but when in the position shown by the red lines in said figure, it releases said wheel, and allows it to be moved by a segment of cogs, $f$, on a hub, L, on said shaft I, which take into the internal segments, $d$, of the wheel H, and turn said wheel, until the cogged sections run out, when the cam K has again arrived at the next cam-surface, $e$, and again holds the wheel H, and so on.

On the shaft I, and adjacent to the hub L, there is a second cogged section, $g$, which is diametrically opposite the cogged section $f$, on said shaft, said section $g$ being on the perimeter of a hub, M, and working into the series of sections of cogs $h$, on the wheel N, which is fixed on the journal of the other series of floats, B C D, so as to give a regularly-timed and intermittent rotary motion to said last-named floats, as will be explained.

The shaft I also carries a cam, O, which works into the curved recesses P of the wheel N, and, when in contact with said surfaces, holds the wheel N from turning, and it runs out of contact therewith just as the cogged segment $g$ takes into one of the cogged sections $h$, on the perimeter of the wheel N.

The series of cogged segments $h$ are formed by the blanks $i$, interposed between them, which blanks admit of the series $g$ going into and out of gear without any sudden motion.

The effect of this intermittently-moving, locking, and stopping-mechanism is, that one of the float-wheels makes nearly one-third of a revolution, while the other float-wheel remains stationary; then the latter starts, and both wheels move together for a short distance, when the first one comes to a state of rest, and is locked from moving until its proper time, and holds the air, gas, or water from passing or flowing back. The succeeding floats move, stop, and hold in a similar manner, their movements and periods of rest being made and controlled positively by the fixed or rigid gears and locking-mechanism operating in connection with the gears.

In sheet 2, I have shown a modification of this machine or apparatus, wherein four instead of three floats are used on each float-wheel. Any other number may be used that will allow them to clear each other in their intermittent and alternating rotations. In this modification a driving-belt is used, instead of rigid gears, and an alternating locking and releasing-mechanism is used, which is operated by cam-grooves in the faces of the wheels, respectively, upon the journals of the float-wheels.

In this modification, A represents the box or case, and $a\,b$ the concentric curved surfaces against which the extremities of the floats move.

In bearing-pieces J J, on the case, a shaft, I, is placed, and which may be turned by any suitable power.

At or near the ends of the shaft I are placed belt-pulleys Q R, which are connected to said shaft by coiled springs $k\,k$, so that, at times, the motion of the shaft may be taken up, in winding the springs, without moving the float-wheels.

Around the pulley Q, and around a pulley, S, on the journal of one of the float-wheels, passes an endless belt, T, by which motion is communicated to said float-wheel; and around the pulley R, and around a pulley, U, on the journal of the other float-wheel, passes an endless belt, V, by which motion is communicated to that float-wheel, the latter belt being twisted, so that the motions of the two float-wheels shall be towards each other.

In the faces of the two pulleys S U there are a series of concentric grooves, $m$, corresponding in number to the series of floats on the float-wheels, which concentric grooves are intercepted by angular grooves, $n$, and a guiding-abutment, $o$, at the angle.

A rod, W, extends across the case, its ends, $r\,r$, being bent into a crank-form, and the ends of the crank-portions, $s$, again bent, so as to enter the grooves in the pulley-wheels S U.

When these bent ends $s$ are in the concentric grooves $m$, they offer no impediment to the rotation of said wheels or to the float-wheels that they are upon; but when they run into the angular grooves $n$, they momentarily check or hold their respective wheels and floats, thus allowing one to move without the other, and then both to move, so that there shall always be one float acting as a cut-off at the centre, as there is always one so acting at each of the ends of the case, and preventing anything from passing backward or in any other direction than that in which the float-wheels move.

The relative positions of the grooved pulleys, with regard to the holding and releasing-arms, is seen in fig. 8, one being in the act of being released whilst the other is in the act of being stopped, so that they may alternate at times, and at times move together, and forming buckets or conveyers for taking up and carrying through the case air, gas, or water.

When used for a blower, the float-wheels should revolve rapidly; when used for a ventilator, they may move more slowly. For passing water or gas, they may be regulated for the special purpose to which the apparatus is to be applied.

In the above description, I have mentioned only the use of these float-wheels where they are driven, or active, and carry through the air, gas, or water, which is passive. The reverse of the operation may be accomplished without changing the character of the machine, that is to say, the force of the through-going air, gas, water, or its vapor may drive the float-wheels, which, in turn, may drive their gearing, and it may be applied, in this way, to any useful purpose.

Having thus fully described my invention, what I claim therein as new, and desire to secure by Letters Patent, is—

The combination, in one case or box, of two float-wheels, that move one before the other and then both together, for the purpose of passing air, gas, or water through the case in one direction only, and prevent it from flowing back, substantially in the manner and for the purpose set forth.

STEPHEN P. RUGGLES.

Witnesses:
F. O. PRINCE,
FELIX McCABE.